(12) United States Patent
Sauber

(10) Patent No.: US 6,792,408 B2
(45) Date of Patent: Sep. 14, 2004

(54) INTERACTIVE COMMAND RECOGNITION ENHANCEMENT SYSTEM AND METHOD

(75) Inventor: William Frederick Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 558 days.

(21) Appl. No.: 09/879,207

(22) Filed: Jun. 12, 2001

(65) Prior Publication Data
US 2002/0188454 A1 Dec. 12, 2002

(51) Int. Cl.[7] ............................................. G10L 15/22
(52) U.S. Cl. ..................................... 704/275; 704/235
(58) Field of Search ................................ 704/251, 235, 704/270, 275

(56) References Cited

U.S. PATENT DOCUMENTS

| | | | |
|---|---|---|---|
| 4,783,803 A | | 11/1988 | Baker et al. |
| 4,805,219 A | | 2/1989 | Baker et al. |
| 4,809,333 A | * | 2/1989 | Taylor ........................ 704/252 |
| 4,914,590 A | | 4/1990 | Loatman et al. |
| 5,329,609 A | | 7/1994 | Sanada et al. |
| 5,465,317 A | * | 11/1995 | Epstein ....................... 704/236 |
| 5,500,920 A | | 3/1996 | Kupiec |
| 5,680,511 A | | 10/1997 | Baker et al. |
| 5,794,050 A | | 8/1998 | Dahlgren et al. |
| 5,960,394 A | | 9/1999 | Gould et al. |
| 5,987,404 A | | 11/1999 | Della Pietra et al. |
| 6,006,183 A | * | 12/1999 | Lai et al. ..................... 704/235 |
| 6,052,666 A | | 4/2000 | Diehl et al. |
| 6,081,774 A | | 6/2000 | De Hita et al. |
| 6,088,671 A | * | 7/2000 | Gould et al. ................. 704/235 |
| 6,192,343 B1 | * | 2/2001 | Morgan et al. .............. 704/275 |
| 6,233,560 B1 | * | 5/2001 | Tannenbaum ............... 704/275 |
| 6,697,782 B1 | * | 2/2004 | Iso-Sipila et al. ........... 704/275 |

* cited by examiner

Primary Examiner—Daniel Abebe
(74) Attorney, Agent, or Firm—Haynes and Boone, LLP

(57) ABSTRACT

An interactive command recognition system and method are described. In a preferred embodiment, responsive to a user inputting a command, or word string, to the interactive command recognition system, a physical recognition portion of the system performs physical recognition functions on the input word string and assigns to a number of candidate matches for each of the individual words of the command, a physical score based on the probability that each word was properly recognized by the system, and then computes an average A of these scores. Similarly, a command recognition portion of the system performs command recognition functions on the input command, assigns to each of the words a score based on the probability that the word is part of a recognized command, and then computes an average B of these scores. These averages A and B can then be used in a variety of manners, depending on the particular implementation of the command recognition system. In one implementation, if B is greater than a predetermined logical threshold, the command is executed. If B is less than the predetermined logical threshold and A is greater than a predetermined physical threshold, indicating that the words were but the command was not understood by the system, the user is advised to rephrase the command. In contrast, if both A and B are less than the respective thresholds, indicating that neither the words nor the command was understood by the system, the user is advised to repeat the command more clearly.

23 Claims, 4 Drawing Sheets

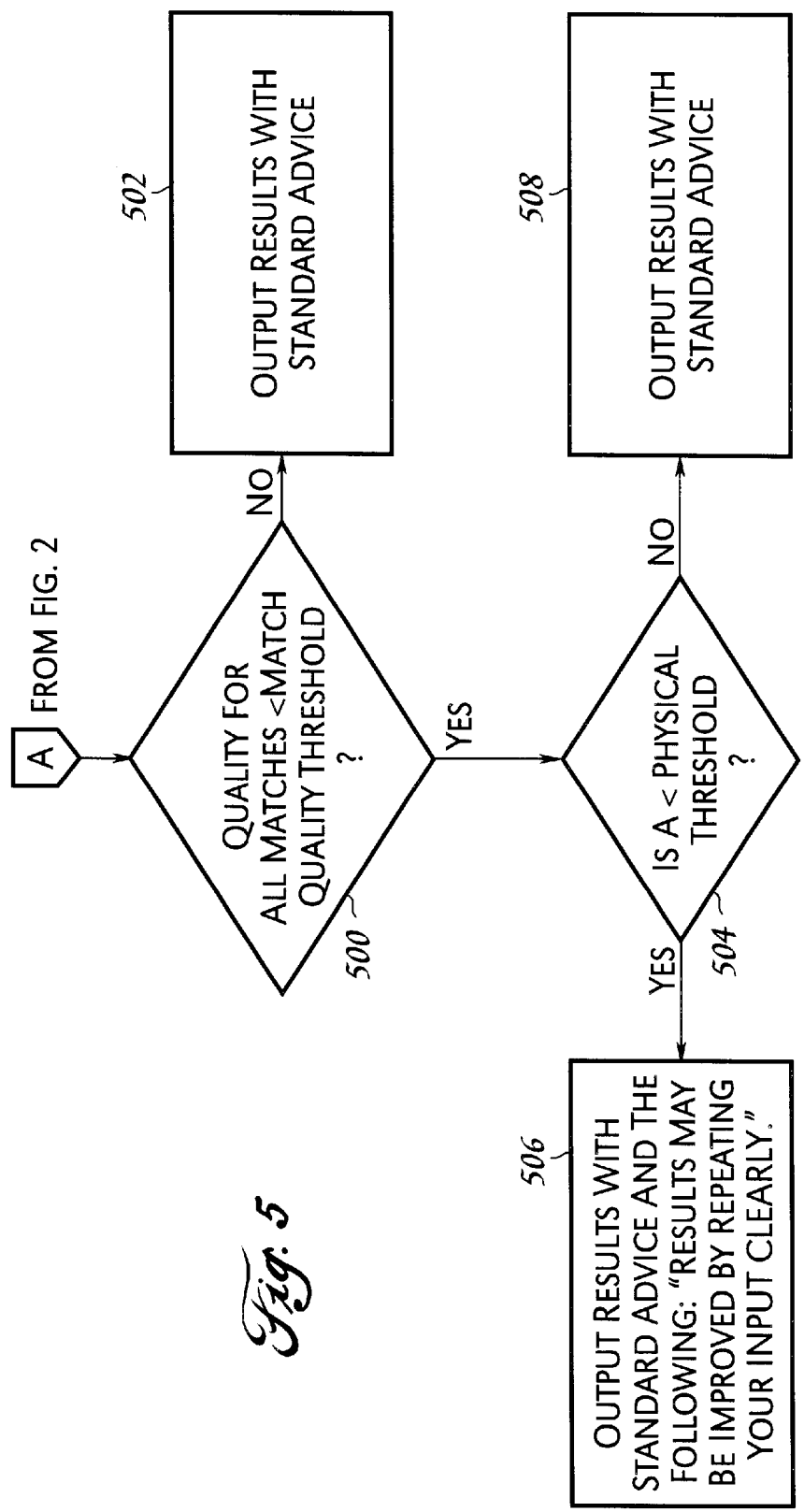

INTERACTIVE COMMAND RECOGNITION ENHANCEMENT SYSTEM AND METHOD

BACKGROUND

The disclosures herein relate generally to computer based speech recognition interfaces and more particularly to an enhanced interactive command recognition system.

There currently exist a wide variety of commercially available word recognition systems. Examples of such systems include speech, or spoken word, recognition systems and hand-writing recognition systems. Even spell-checking systems can be considered to be a form of word recognition systems in the sense that they find the most probable words in a dictionary that most closely match a string of characters.

The systems of interest attempt to match acoustic input with stored acoustic patterns based on parameters that include frequency, relative amplitude, and duration to identify words in a predetermined vocabulary. In the case of handwriting, input strokes are analyzed based on parameters including height, angle, and spacing.

Building on analysis of the physical input such as that described above (e.g., acoustic patterns for audio input and input strokes for handwritten input), context can be used to enhance these systems. For example, a dictation system that receives the input "the next line of computers to be introduced will include high quality microphones" would simply enter that text as a sentence. If the system received "the next line of computers to be introduced will include high quality microphones next line", the system would enter "The next line of computers to be introduced will include high quality microphones." and go to the next line. Note that the first "next line" is an implicit command to enter text while the second "next line" is an explicit command to go to the next line. The difference in response is based on the context in which the words are used. Context (including grammar-based) can also be used to resolve words that sound identical such as to, too, and two.

Building on the concepts of input pattern recognition and context is equivalence of meaning. This concept is useful in command recognition and search engines. The object is to determine that two words or phrases are equivalent. This can be accomplished through lists of equivalent words or phrases. In addition, probabilities that each word/phrase in a list is equivalent to the input word/phrase determined by physical pattern matching can be maintained.

A basic distinction can be made between features and techniques in a system that distinguish inputs based on their physical characteristics and those that distinguish inputs based on their meaning. Systems that base their results on techniques that attempt to determine what the input means might be considered a form of natural language interface. Systems combining physical and meaning, or logic, based techniques may be embedded, as in the case of car phones, may be used to implement dictation functions or search engines, may be used purely for command recognition, or may exist as a form of natural language interface to a variety of computer applications. The terms logical and logical techniques will be used to refer nonphysical/non-pattern-matching or intent/meaning based recognition results and processes.

In any of the above cases, it will be recognized that it is possible to determine a probability that the system has properly determined either the identity, in the case of physical recognition, or the meaning, in the case of logical recognition, of a word or sequence of words, and that this probability may be assigned a numerical value. Examples of such systems are shown and described in U.S. Pat. No. 4,783,803 to Baker et al., U.S. Pat. No. 5,960,394 to Gould et al., and other prior art patents.

Clearly, in the case of a system that combines both physical and logical recognition, there will be instances in which the system cannot identify with sufficient certainty a particular word or series of words entered (spoken or written) by the user, as well as instances in which the system fails to recognize the word or words as a logical entity such as a command. In either case, the feedback to the user available from currently available systems would be something along the lines of "please repeat your statement" or "I think you said . . . ", leaving the user with no clear understanding of whether the system failed to recognize a word or words individually, or failed to recognize meaning of the word or words.

Therefore, what is needed is a command recognition system that provides more detailed feedback to the user as to why an input was not recognized by the system. For example a dictation system might receive the input "the fisherman lost his hook end line". The system could attempt to elicit clearer pronunciation through a request to repeat the statement more clearly if the acoustic certainty (between and and end) was low. If the acoustic certainty of end was high, the system might elicit a rephrase of the command because "end line" was not a legal command (The system may disallow it due to ambiguity; it might mean last line of page, last line of document, etc.) The example cited here is based on a dictation system, but even greater benefit would be derived from hands free, eyes free audio command systems or information access systems (e.g., search engines) driven by audio or handwritten input.

SUMMARY

One embodiment, accordingly, provides an interactive command recognition system. In a preferred embodiment, responsive to a user inputting a command, or word string, to the interactive command recognition system, a physical recognition portion of the system performs physical recognition functions on the input word string and assigns to a number of candidate matches for each of the individual words of the command, a physical score based on the probability that the word was properly recognized by the system, and then computes an average A of these scores. Similarly, a logical recognition portion of the system performs recognition functions on the output of the physical recognition portion, assigns to each of its results a score based on the probability that the word is part of a recognized command, and then computes an average B of these scores.

These averages A and B can then be used in a variety of manners, depending on the particular implementation of the command recognition system. In one embodiment, if B is greater than a predetermined logical threshold, the command is executed. If B is less than the predetermined logical threshold and A is greater than a predetermined physical threshold, indicating that the words were but the command was not understood by the system, the user is advised to rephrase the command. In contrast, if both A and B are less than the respective thresholds, indicating that neither the words nor the command was understood by the system, the user is advised to repeat the command more clearly.

In another embodiment, the averages A and B are weighted using appropriate constants and a sum of the weighted averages is compared to a predetermined threshold. In this embodiment, if the sum of the weighted averages is greater than the predetermined threshold, the command is executed. If the sum of the weighted averages is less than the predetermined threshold, the averages A and B are reweighted using the same or different constants than those used above and a determination is made whether the reweighted average A is greater than the reweighted constant B. If so, the user in advised to rephrase the command; otherwise, the user is advised to repeat the command more clearly.

In yet another embodiment, the input word string is a search request. In this embodiment, a determination is made whether the quality for all matches is less than a Match Quality Threshold ("MQT"). Search engines will frequently provide quality ratings for each of the matches returned to the requester, such as one to five stars or a percentage to indicate the relative quality of the matches. The MQT is a value in similar units that indicates that adequate matches were found for the request. If all results are not less than the MQT, the search results are acceptable and output to the user with standard advice; otherwise, a determination is made whether A is less than a predetermined physical threshold. If so, indicating that one or more words may not have been correctly recognized, the search results are output to the user along with an indication that results may be improved by the user's repeating the input word string more clearly. If it is determined that A is not less than the predetermined physical threshold, the results are output to the user with standard advice.

A principal advantage of the embodiments is that they clarify the additional input needed from the user, whether it be rephrasing of an input command or a clearer repetition of the command. Note that these embodiments show physical and logical based functions of the recognition process occurring sequentially. This is done for clarity, and the only requirement of the invention is that scores for physical and logical based analysis be retained for post-processing or that the disclosed enhancements (e.g., computation of A, B) be partially embedded in the recognition process.

BRIEF DESCRIPTION OF THE DRAWING FIGURES

FIG. 5 is a flowchart of the operation of another alternative application of the embodiment of FIG. 1 utilizing the physical recognition probability calculated as shown in FIG. 2.

DETAILED DESCRIPTION

Figure 1A:
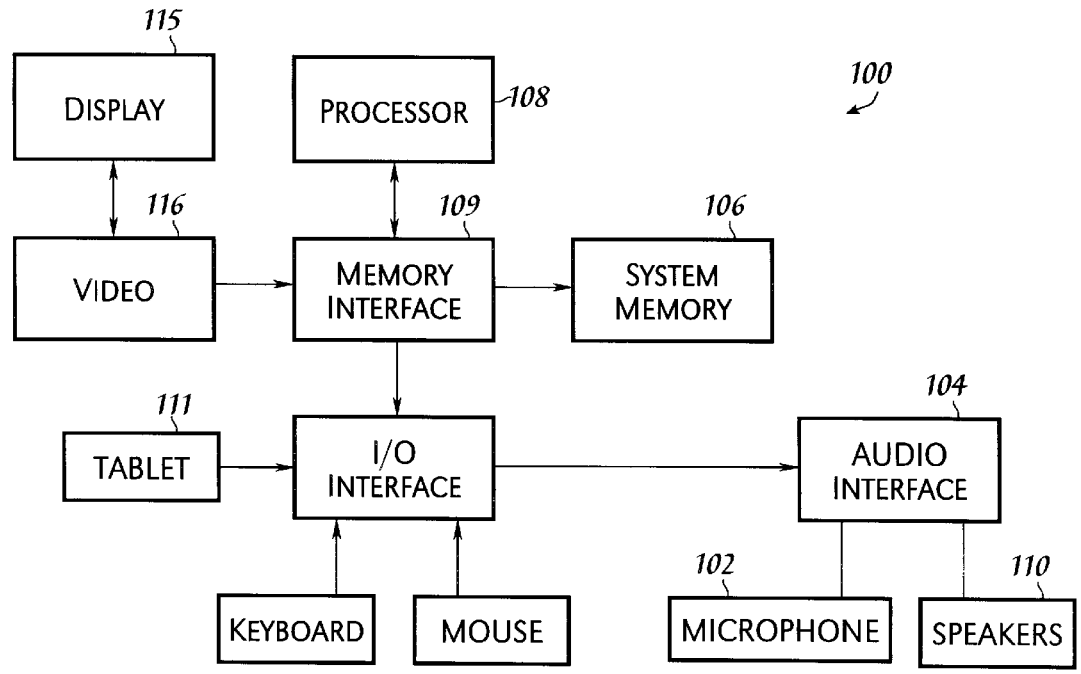
FIG. 1a is a block diagram of an embodiment of an interactive command recognition enhancement system implemented in a personal computer.

Referring to FIG. 1a, an interactive command recognition enhancement system implemented as a computer system is designated by a reference numeral 100. As shown in FIG. 1a, spoken commands are input to the system 100 via a microphone 102, which may be embodied in a headset (not shown), and digitized by an audio interface 104. The digitized speech is stored in system memory 106 and code executable by a processor 108, which is connected to system memory 106 via a memory interface 109, processes and analyzes the data as described herein. Feedback to a user is provided when stored digital representations of a word string are sent to the audio interface 104 from system memory 106 for conversion to analog signals. These analog signals then drive speakers 110, which may be embodied in a headset (not shown).

Additionally, forms of input other than spoken commands, such as handwritten text entered using a tablet 111 and processed using code executable by the processor 108 may be used to input commands or word strings to the system 100. Similarly, forms of output other than spoken words, such as text displayed on a display 115 connected to a video subsystem 116, may be used to provide feedback to the user. Other implementations using multiple processors and USB microphones and speakers, for example, are possible.

Figure 1B:
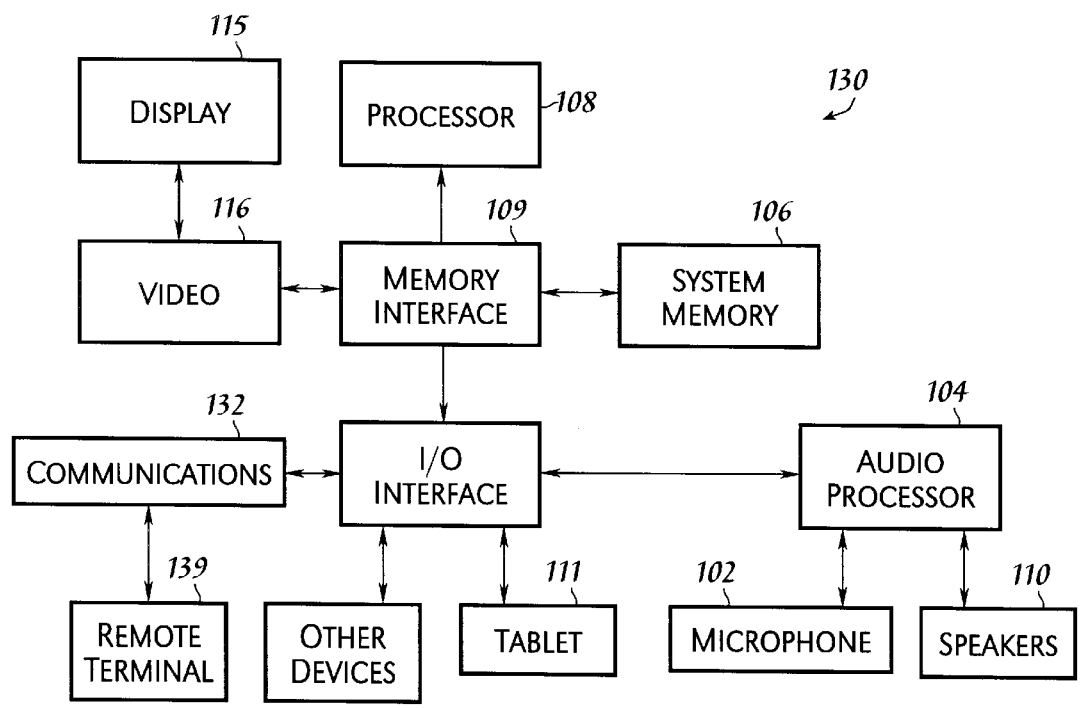
FIG. 1b is a block diagram of a generic interactive command recognition enhancement system embodying features of one embodiment.

FIG. 1b illustrates a more generic implementation of an interactive command recognition enhancement system, designated by a reference numeral 130. Of special interest in the system 130 is a communications path 132. In this case, input and feedback devices connected to a remote terminal 139 might be located anywhere in the world relative to the processor 108. The remote terminal 139 could be connected to the processor 108 via a telephone line or could comprise a wireless handheld device. Additionally, the remote terminal 139 could have connected thereto any combination of the input and output devices shown in FIGS. 1a and 1b as being connected to the system 100.

It will be recognized that, in both systems 100 and 130, not all of the input and/or output devices will be necessary or included in the system. For example, it is possible that only voice or handwritten input will be accepted, in which case, only the microphone 102 or tablet 111, respectively, will be included in the system.

Figure 2:
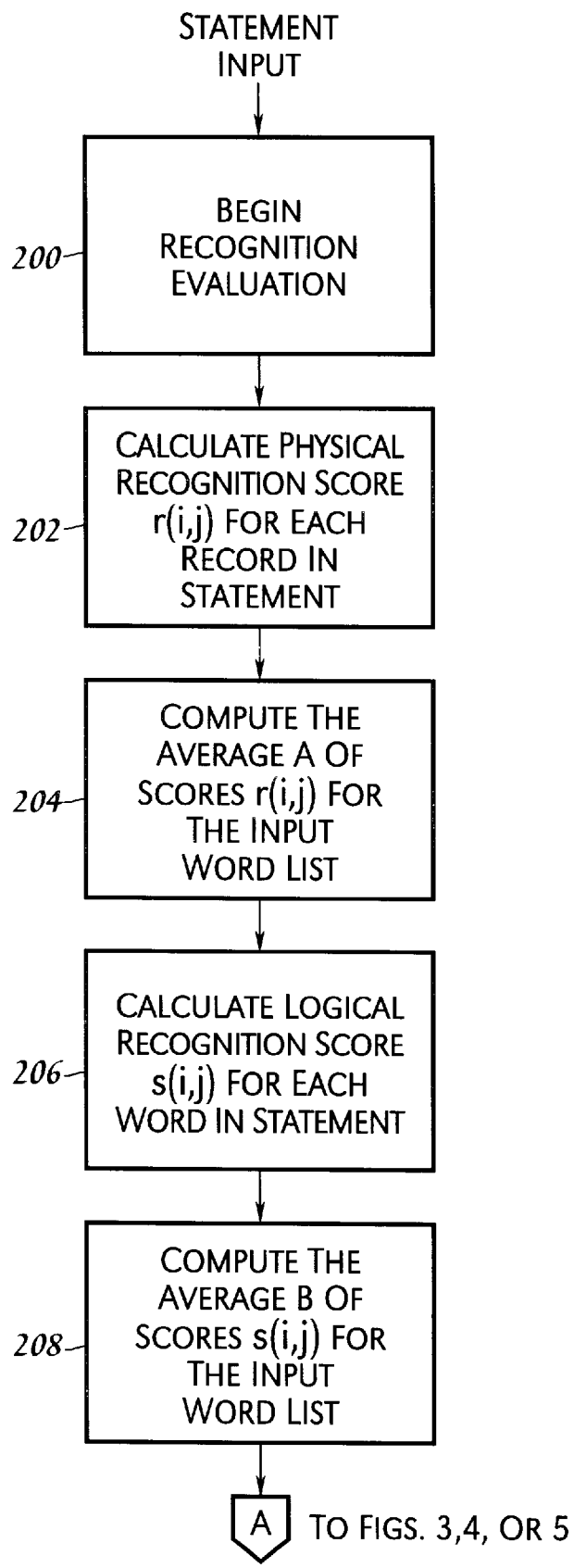
FIG. 2 is a flowchart of the calculation of physical and logical recognition probabilities of the embodiment of FIG. 1.

FIG. 2 is a flowchart of the general operation of the interactive command recognition enhancement system 100 shown in FIG. 1. As shown in FIG. 2, command recognition evaluation begins in step 200 in response to receipt of a word string, which may be a command, input by a user. Although for purposes of this example, it will be assumed that the word string is spoken, it should be recognized that the word string may be input in a different manner, such as handwritten using an electronic stylus and pad connected to the system 100. In step 202, the system 100 computes for each word in the string, a recognition score $r(i,j)$, where i represents word i in the string and j represents candidate j for word i of the string. The physical score $r(i,j)$ represents how certain the system 100 is that the word corresponding to the score was correctly recognized. A higher score indicates greater certainty that a particular word was correctly recognized by the system 100; a lower score indicates a lower certainty that the particular word was correctly recognized by the system 100.

Recognition scores $r(i, j)$ are calculated in the physical recognition process using acoustic information as described in the prior art. In an exemplary implementation, j=1–4 during the recognition process for each word i. As better matches are identified, the lowest scoring word is replaced with the better match.

Once the recognition scores r(i,j) have been calculated, execution proceeds to step 204, in which a physical recognition probability "A" representing an average of the scores r(i,j) is calculated. Execution then proceeds to step 206, in which the system 100 computes for each word, a logical score s(i,j). The logical score represents how certain the system 100 is that the candidate words from the physical analysis form a part of a recognizable command. As with the physical recognition scores above, a higher score indicates greater certainty that a particular word was recognized by the system 100 as part of a recognized command; a lower score indicates a lower certainty that the particular word was recognized by the system 100 as part of a recognized command. An example of one method of calculating logical scores s(i,j) is a list of words that might be substituted for the expected command word, although it will be recognized that other prior art methods may be used. Specifically, the process scores the likelihood that one word would be used as a substitute for another or that phrases are equivalent in the context of commands expected by the system. Once the logical scores s(i,j) have been calculated in step 206, execution proceeds to step 208, in which a logical recognition probability "B", representing an average of the scores s(i,j), is calculated.

In alternative embodiments, the physical and logical recognition probabilities A and B, respectively, need not be simply an average of scores r(i,j) and s(i,j), respectively, but may be calculated using one of a variety of other methods. It is likely that this portion of the process would only use the most likely word candidates. For example, A may be calculated using only the highest physical score; discarding the highest and lowest physical scores and computing the average of the remaining physical scores; using only physical scores corresponding to words used in calculating B (described below), using only physical scores corresponding to words used in calculating B (described below) after discarding physical scores for words that are articles; and by computing the mean, instead of the average, of the physical scores.

Similarly, B may be calculated using only the highest logical score; discarding the highest and lowest logical scores and computing the average of the remaining logical scores; using only logical scores for words in the selected command, using only logical scores for words in the selected command after discarding the highest and lowest logical scores; using only the logical scores for words used in the selected command after discarding logical scores for words that are articles; by computing the mean, instead of the average, of the logical scores; and computing the difference between the highest and lowest logical scores.

It will be recognized that even the foregoing list of examples is not exhaustive and that there will be even more methods for calculating values for A and B. The primary point is that A must be some representation of how certain the system 100 is that the input words were correctly recognized and B must be some representation of how certain the system 100 is that the input words form a recognized command. Once values for A and B have been calculated as described above, the data can be used in a variety of ways to implement a variety of functions and features.

Figure 3:
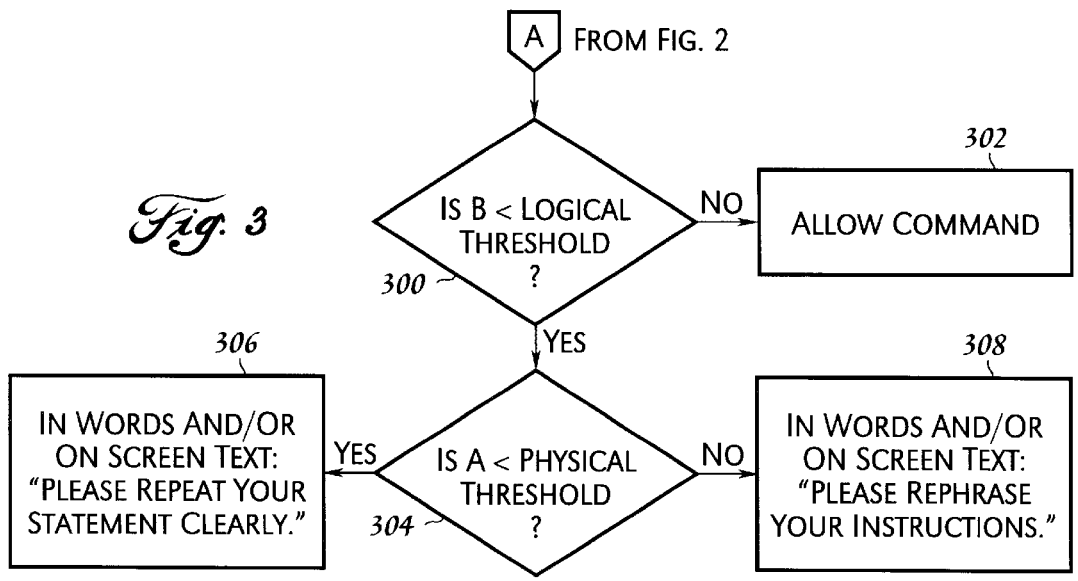
FIG. 3 is a flowchart of the operation of one application of the embodiment of FIG. 1 utilizing the physical and logical recognition probabilities calculated as shown in FIG. 2.

For example, referring to FIG. 3, in step 300, a determination is made whether the value for B calculated in step 208 above is less than a predetermined logical threshold. If not, indicating that the command was correctly recognized, execution proceeds to step 302, in which the command is allowed and/or executed. If the value for B is less than the predetermined logical threshold, indicating that the command may not have been correctly recognized, execution proceeds to step 304, in which a determination is made whether the value for A calculated in step 204 above is less than a predetermined physical threshold.

If the value for A is less than the predetermined physical threshold, indicating that the words were not properly recognized, execution proceeds to step 306, in which the user is instructed to repeat the command more clearly. If the value for A is not less than the predetermined physical threshold, indicating that the words were properly recognized, execution proceeds to step 308, in which the user is instructed to rephrase the command so as to form a recognized command.

Figure 4:
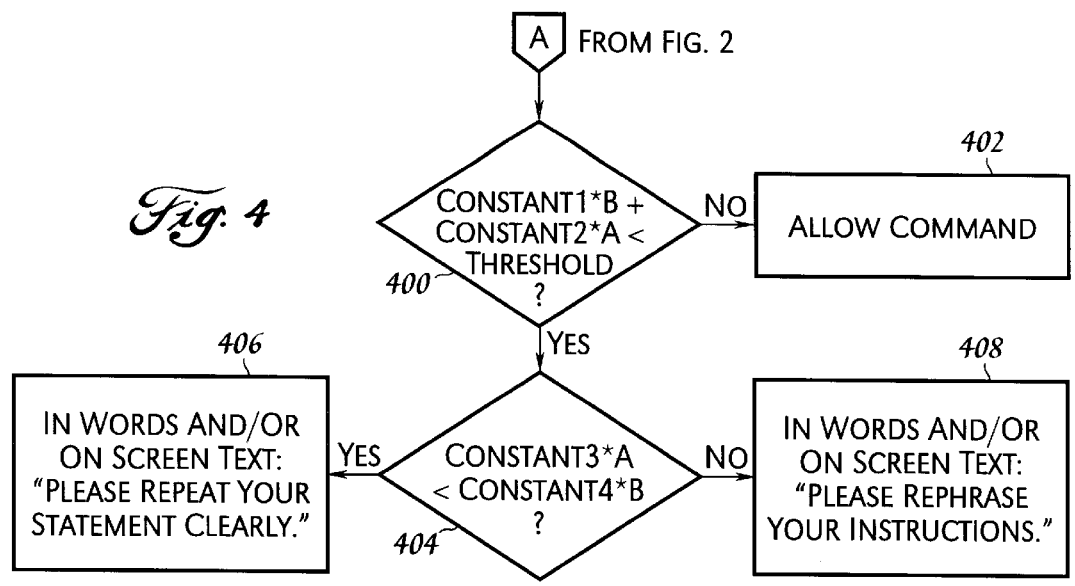
FIG. 4 is a flowchart of the operation of an alternative application of the embodiment of FIG. 1 utilizing the physical and logical recognition probabilities calculated as shown in FIG. 2.

Referring now to FIG. 4, another exemplary use of the data calculated as shown in FIG. 2 is illustrated. In step 400, a determination is made whether the sum of some weighted value for A and some weighted value for B is less than a predetermined threshold. In a preferred embodiment, weighting is used to normalize and adjust the scores based on the characteristics of the system. In the case of normalization, if the physical scores ranged from one to ten and the logical scores were probabilities from zero to one, the logical recognition probability B would be multiplied by ten; alternatively, the physical recognition probability A could be multiplied by 0.1. In a system that contained a very limited vocabulary and poor microphones, the importance of context might be given greater weight, therefore the value used to weight the logical recognition probability B would be large relative to value used to weight the physical recognition probability A.

If the sum calculated in step 400 is not less than the predetermined threshold, indicating that the command was correctly recognized, execution proceeds to step 402, in which the command is allowed and/or executed. If the sum calculated in step 400 is less than the predetermined logical threshold, indicating that either one or more words or the command may not have been correctly recognized, execution proceeds to step 404, in which a determination is made whether some weighted value for A is less than some weighted value for B. If so, indicating that it is more likely that the words were not correctly recognized than that the command is improperly phrased, execution proceeds to step 406, in which the user is instructed to repeat the command more clearly. If a negative determination is made in step 404, indicating that it is more likely that the command is improperly phrased than that the words were not correctly recognized, execution proceeds to step 408, in which the user is instructed to rephrase the command so as to form a recognized command.

Referring now to FIG. 5, yet another exemplary use of the data calculated as shown in FIG. 2 is illustrated. In particular, FIG. 5 illustrates use of the data in implementing a search engine, where the input to the system 100 represents a search request. In this implementation, only the value of A is used. In step 500, a determination is made whether the quality for all matches is less than a Match Quality Threshold ("MQT"). Match Quality ("MQ") is a number provided by many search engines currently available to indicate the quality of each match developed by the search engine. Search results are typically presented to the user in order of MQ, such that "better" matches are presented first. If in step 500 it is determined that the quality for all matches is not less than the MQT, indicating that the search results are acceptable, execution proceeds to step 502, in which results are output with standard advice, typically advising the user on how to improve the search query. Otherwise, execution proceeds to step 504, in which a determination is made whether A is less than a predetermined physical threshold. If so, indicating that one or more words may not have been correctly recognized, execution proceeds to step 506, in which the search results are output with standard advice and an indication that results may be improved by the user's repeating the input word string more clearly. If it is determined in step 504 that A is not less than the predetermined physical threshold, execution proceeds to step 508, in which the results are output with standard advice.

Referring briefly again to FIG. 2, in an alternative embodiment, steps 206 and 208 are not executed, and only A is calculated and used in providing a response to the user. Referring to FIG. 3, in one embodiment, this may be accomplished, for example, by skipping steps 300 and 302 and instead making a determination whether the input word string is a recognized command (not shown). If so, the command is executed (e.g., step 302); otherwise, execution proceeds to step 304 and then to step 306 or step 308, as required by the results of the determination made in step 304. Similar modifications may be made to the process illustrated in FIG. 5

Although illustrative embodiments have been shown and described, a wide range of modification change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of increasing the likelihood that an input string is correctly identified by a system, the method comprising:

determining a probability that each word in the input string was correctly identified by the system;

determining a probability that the input string comprises a recognized command;

determining whether the probability that the words were correctly identified by the system is greater than the probability that the input string comprises a recognized command;

responsive to a determination that the probability that the words were correctly identified by the system is greater than the probability that the input string comprises a recognized command, providing feedback to the user intended to elicit a different input string; and responsive to a determination that the probability that the words were correctly identified by the system is not greater than the probability that the input string comprises a recognized command, providing feedback to the user intended to elicit the same input string spoken more clearly.

2. The method of claim 1 wherein the determining a probability that each word in the input string was correctly identified by the system comprises, assigning to each word of the input string a physical score representing a probability that the word was correctly identified by the system, and using the physical scores to determine a physical recognition probability, and wherein the determining a probability that the input string comprises a recognized command, comprises assigning to each word in the input string a logical score representing a probability that the words form a recognized command and using the logical scores to determine a logical recognition probability.

3. The method of claim 2 wherein the determining whether the probability that the words were correctly identified by the system is greater than the probability that the input string comprises a recognized command, comprises:

determining whether the logical recognition probability is less than a first predetermined threshold;

determining whether the physical recognition probability is less than a second predetermined threshold;

and wherein the providing feedback to the user comprises:

responsive to a determination that the logical recognition probability is less than the first predetermined threshold and the physical recognition probability is not less than the second predetermined threshold, providing feedback to the user intended to elicit a different input string; and responsive to a determination that the logical recognition probability is less than the first predetermined threshold and the physical recognition probability is less than the second predetermined threshold, providing feedback to the user intended to elicit the same input string spoken more clearly.

4. The method of claim 3 further comprising, if the logical recognition probability is not less than the first predetermined threshold, processing the input string.

5. The method of claim 2 wherein the using the logical scores to determine a logical recognition probability comprises, a technique selected from a group consisting of using the highest logical score as the logical recognition probability; discarding the highest and lowest logical scores and computing the average of the remaining logical scores; calculating an average of logical scores for words occurring in a selected command; calculating an average of logical scores for words occurring in the selected command after discarding the highest and lowest of those logical scores; computing the mean of the logical scores; or calculating a difference between the highest and lowest logical scores.

6. The method of claim 5 wherein the using the physical scores to determine a physical recognition probability comprises, a technique selected from a group consisting of calculating an average of physical scores for words occurring in the selected command; and calculating an average of physical scores for words occurring in the selected command after discarding physical scores for words that are articles.

7. The method of claim 2 wherein the using the physical scores to determine a physical recognition probability comprises, using a technique selected from a group consisting of using the highest physical score as the physical recognition probability; computing an average of the physical scores; discarding the highest and lowest physical scores and computing the average of the remaining physical scores; and computing the mean of the physical scores.

8. The method of claim 2 wherein the determining whether the probability that the words were correctly identified by the system is greater than the probability that the input string comprises a recognized command comprises:

computing a sum of the logical recognition probability and the physical recognition probability;

determining whether the sum is less than a predetermined threshold; and responsive to a determination that sum is less than the predetermined threshold, comparing the logical recognition probability with the physical recognition probability; and wherein the providing feedback to the user comprises:

if the logical recognition probability is less than the physical recognition probability, providing feedback to the user intended to elicit a different input string; and if the logical recognition probability is not less than the physical recognition probability, providing feedback to the user intended to elicit the same input string spoken more clearly.

9. The method of claim 8 further comprising, prior to the determining, weighting the logical recognition probability and the physical recognition probability with first and second weighting constants, respectively.

10. The method of claim 8 further comprising, prior to the comparing, weighting the logical recognition probability and the physical recognition probability with first and second weighting constants, respectively.

11. A method of increasing the likelihood that an input word string comprising a search request was correctly understood by a command recognition system comprising a search engine, the method comprising:
   determining whether a match quality for all matches is less than a match quality threshold ("MQT");
   if the match quality for all matches is not less than the MQT, outputting to the user the matches with standard advice;
   if the match quality for all matches is less than the MQT, determining a probability that the system failed to identify a word in the input word string;
   responsive to a determination that the probability that the system failed to identify a word in the input word string is higher than a predetermined recognition threshold, outputting to the user the matches and advising the user to repeat the input word string more clearly; and
   responsive to a determination that the probability that the system failed to identify a word in the input word string is not higher than a predetermined recognition threshold, outputting to the user the matches with standard advice.

12. A method of increasing the likelihood that an input string is accurately identified by a system, the method comprising:
   evaluating the input string;
   determining, based on the evaluating, a likelihood that words comprising the input string were properly recognized by the system;
   determining, based on the evaluating, a likelihood that the input string corresponds to a recognized command;
   responsive to a determination that the likelihood of the words comprising the input string were properly recognized by the system is lower than a first predetermined threshold, advising a user to repeat the input word string more clearly; and
   responsive to a determination that the likelihood that the input string corresponds to a recognized command is lower than a second predetermined threshold, advising the user to rephrase the input word string.

13. The method of claim 12 wherein the input string is input to the system in a form selected from a group consisting of handwritten text and audio.

14. A computer comprising a processor, a memory device connected to the processor, and an enhanced command recognition system, the enhanced command recognition system comprising:
   a physical recognition portion for performing physical recognition functions on a word string input to the system and determining a likelihood that the words were properly identified by the physical recognition portion;
   a logical recognition portion for performing logical recognition functions on the input word string and determining a likelihood that input the word string forms a recognized command;
   means for comparing the likelihood that the words comprising the input word string were properly identified by the system with a first predetermined threshold and for comparing the likelihood that the input word string corresponds to a recognized command with a second predetermined threshold;
   means, responsive to a determination that the likelihood of the words comprising the input word string were properly identified by the system is lower than a first predetermined threshold, for advising a user to repeat the input word string more clearly; and
   means, responsive to a determination that the likelihood that the input word string corresponds to a recognized command is lower than a second predetermined threshold, for advising the user to rephrase the input word string.

15. The computer of claim 14 wherein the input word string is input to the system in a form selected from a group consisting of handwritten text, typewritten text, and audio.

16. A method of increasing the likelihood that an input string is correctly identified by a system, the method comprising:
   determining whether the input string comprises a recognized command;
   responsive to a determination that the input string does not comprise a recognized command, determining a probability that each word in the input string was correctly identified by the system;
   comparing the probability that each word in the input string was correctly identified by the system with a predetermined threshold;
   responsive to a determination that the probability that each word in the input string was correctly identified by the system is greater than the predetermined threshold, providing feedback to the user intended to elicit a different input string; and
   responsive to a determination that the probability that each word in the input string was correctly identified by the system is not greater than the predetermined threshold, providing feedback to the user intended to elicit the same input string spoken more clearly.

17. The method of claim 16 wherein the determining a probability that each word in the input string was correctly identified by the system comprises, assigning to each word of the input string a physical score representing a probability that the word was correctly identified by the system, and using the physical scores to determine a physical recognition probability.

18. The method of claim 17 wherein the using the physical scores to determine a physical recognition probability comprises, using a technique selected from a group consisting of using the highest physical score as the physical recognition probability; computing an average of the physical scores; discarding the highest and lowest physical scores and computing the average of the remaining physical scores; and computing the mean of the physical scores.

19. The method of claim 16 further comprising, responsive to a determination that the input string comprises a recognized command, processing the input string.

20. A system for increasing the likelihood that an input string is correctly identified by the system, the system comprising:
   means for determining whether the input string comprises a recognized command;

means, responsive to a determination that the input string does not comprise a recognized command, for determining a probability that each word in the input string was correctly identified by the system;

means for comparing the probability that each word in the input string was correctly identified by the system with a predetermined threshold;

means, responsive to a determination that the probability that each word in the input string was correctly identified by the system is greater than the predetermined threshold for providing feedback to the user, for eliciting a different input string; and means, responsive to a determination that the probability that each word in the input string was correctly identified by the system is not greater than the predetermined threshold for providing feedback to the user, for eliciting the same input string spoken more clearly.

21. The system of claim 20 wherein the means for determining a probability that each word in the input string was correctly identified by the system comprises, means for assigning to each word of the input string a physical score representing a probability that the word was correctly identified by the system, and using the physical scores to determine a physical recognition probability.

22. The system of claim 21 wherein the means for assigning the physical scores to determine a physical recognition probability is selected from a group consisting of means for using the highest physical score as the physical recognition probability; means for computing an average of the physical scores; means for discarding the highest and lowest physical scores and computing the average of the remaining physical scores; and means for computing the mean of the physical scores.

23. The system of claim 20 further comprising means responsive to a determination that the input string comprises a recognized command for processing the input string.

* * * * *